United States Patent
Asano et al.

[11] Patent Number: 6,101,081
[45] Date of Patent: *Aug. 8, 2000

[54] MAGNETIZING METHOD FOR ROTOR MAGNET OF RELUCTANCE MAGNET MOTOR

[75] Inventors: Yoshinari Asano, Takefu; Masayuki Shinto, Sabae; Hiroshi Ito, Takefu; Yukio Honda, Katano; Hiroshi Murakami, Suita; Naoyuki Kadoya, Kadoma; Shizuka Yokote, Osaka, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,812

[22] Filed: Mar. 6, 1997

[30] Foreign Application Priority Data

Mar. 8, 1996 [JP] Japan ..................................... 8-051720

[51] Int. Cl.[7] .................................................. H02K 15/03
[52] U.S. Cl. .............................................. 361/143; 361/139
[58] Field of Search ....................... 361/139, 143; 335/284; 310/46, 48, 49 R; 29/598, 732

[56] References Cited

U.S. PATENT DOCUMENTS

| | | | |
|---|---|---|---|
| 4,748,535 | 5/1988 | Arakawa et al. | 361/148 |
| 5,200,729 | 4/1993 | Soeda et al. | 335/284 |
| 5,424,902 | 6/1995 | Shida et al. | 361/148 |

FOREIGN PATENT DOCUMENTS 1 277 335  11/1961  France .
57-142165  9/1982  Japan .

OTHER PUBLICATIONS

Patent Abstracts of Japan, unexamined applications, E field, vol. 6, No. 64, Apr. 23, 1982, p. 83 E 103 & JP–A–57 005 313 (Matsushita).

*Primary Examiner*—Fritz Fleming
*Attorney, Agent, or Firm*—McDermott, Will & Emery

[57] ABSTRACT

A rotor magnet of a three-phase reluctance magnet motor is magnetized by coupling two of the three outer terminals (RS), and feeding a positioning current between the outer terminals RS and a third terminal (T) for positioning the rotor at a magnetizing position with reluctance torque. Then, rotor is kept from moving by holding the shaft of the rotor with the rotor positioned at the magnetized position. Next, the outer terminals RS are separated and magnetizing current is fed between the outer terminals R and S to magnetize the rotor magnet.

8 Claims, 10 Drawing Sheets

MAGNETIZING METHOD FOR ROTOR MAGNET OF RELUCTANCE MAGNET MOTOR

BACKGROUND OF THE INVENTION

The present invention relates to a method of magnetizing a rotor magnet of a reluctance magnet motor. The method of magnetizing comprises two steps: first, electric current is fed to a stator coil to position a rotor at a magnetizing position by a reluctance torque, and then, electric current is fed to the stator coil to magnetize a rotor magnet.

FIG. 10 is a drawing from a Japanese Patent Application (Publication No. S57-14261), which depicts how a stator coil is used for both positioning and magnetizing a rotor. According to S57-14261, a magnetic pole that has been weakened by some accident is remagentized. A rotor 2 comprises a rotor core 2a, a rotor magnet 3d made of permanent magnet, and a stainless tube 7, which prevents breakage of the rotor magnet 3d due to centrifugal force. Since the reluctance of the rotor 2 is equal in all radial directions, this motor generates only magnet torque, and does not generate reluctance torque. The rotor magnet 3d has weakened magnetic poles N and S. First, as shown in FIG. 10(a), positioning current Ip is fed from a positioning power supply 9a to the outer terminals R and S of the stator, thereby generating stator field E. Then the rotor 2 is rotated by the magnet torque produced between the stator field E and the magnetic poles N and S. The rotor 2 is rotated to a position where the magnetic poles N and S, and the stator field E, are oriented in the same direction. Next, as shown in FIG. 10(b), magnetizing current Im is fed from a magnetizing power supply 9b to the outer terminals T and S of the stator, thereby producing magnetized field G as stator field. Then, the rotor 2 is remagnetized by the magnetizing field G while rotating in the direction of the arrow driven by the magnetic torque produced between the magnetized field G and the magnetic poles N and S. The rotation of the rotor is utilized for widening a magnetizing width over the coil pitch of the stator winding.

BRIEF SUMMARY OF THE INVENTION

The present invention provides a method of magnetizing a rotor magnet of a reluctance magnet motor. The magnetizing method comprises the following steps:

(a) Feed a positioning current to the stator coil so that the rotor can be positioned at the magnetizing position by reluctance torque.

(b) Hold the rotor positioned at the magnetizing position in order to avoid moving.

(c) Feed magnetizing current to the stator coil so that the rotor can be magnetized.

The step (c) further includes weak magnetizing of the rotor with weak magnetizing current before normal magnetizing in order to prevent the rotor from being damaged due to motor torque produced in magnetizing the rotor.

The invention itself, together with further objects and attendant advantages, will best be understood by reference to the following detailed description taken in conjunction with the accompanying figures.

DETAILED DESCRIPTION OF THE INVENTION

Figure 6:
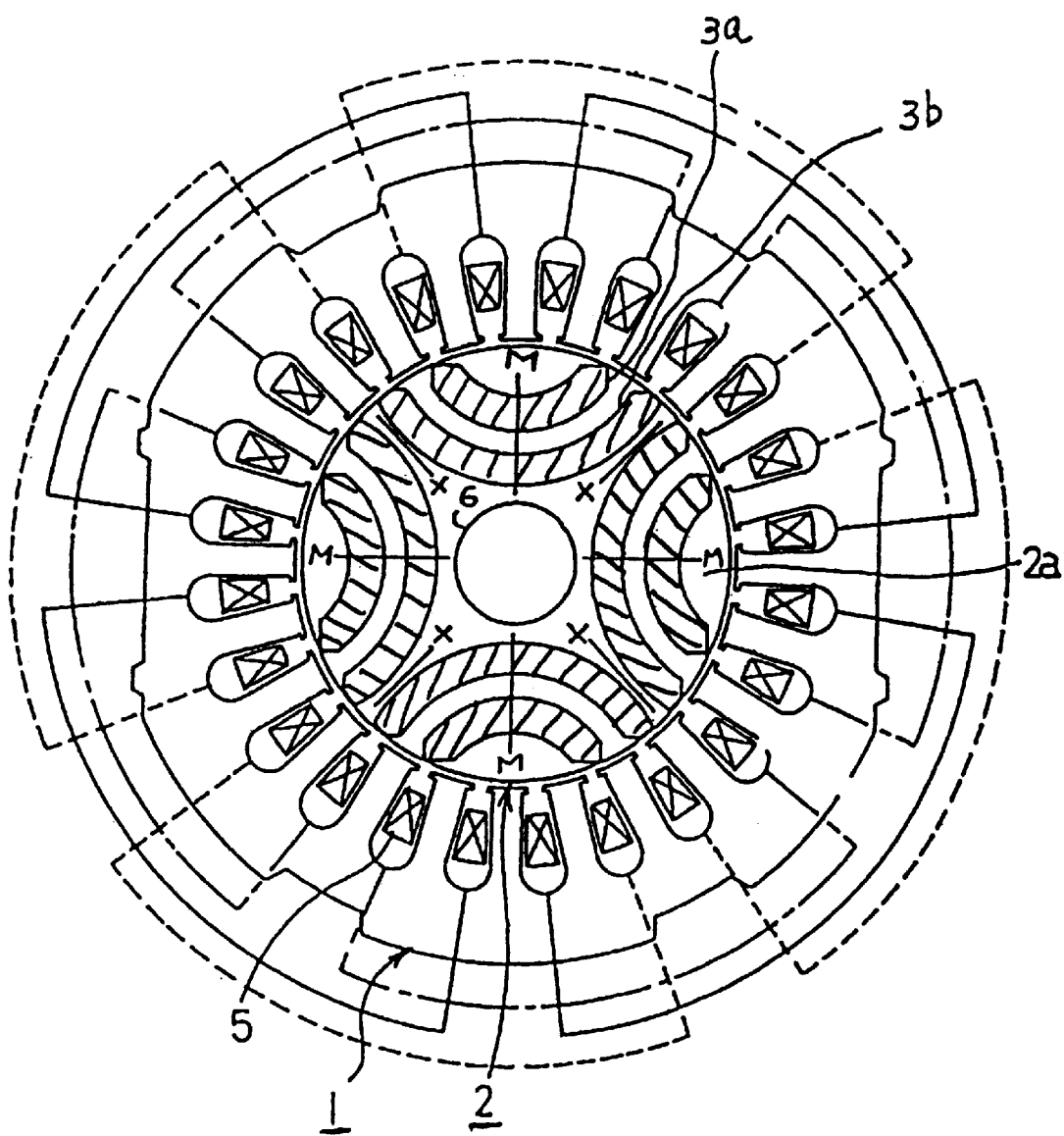
FIG. 6 depicts a low reluctance axis X and a magnetizing axis M of a four-pole-reluctance-magnet-motor used in the first and second exemplary embodiments of the present invention.

A reluctance magnet motor, which is driven by both magnet torque and reluctance torque has been widely known. FIG. 6 depicts a four-pole-reluctance-magnet-motor. A rotor 2 comprises the following elements:

(a) a rotor core 2a made of high permeability materials such as laminated iron plate, (b) unmagnetized rotor magnets 3a and 3b extending through the rotor core 2a, and (c) a rotating shaft 6 fixed to the rotor core 2a.

The rotor magnets 3a and 3b are magnetized along the magnetizing axis M by a magnetizing process that is described later. The rotor 2 does not have uniform reluctance in this motor. The rotor reluctance, viewed from the stator, is minimum at a low reluctance axis X, which is 90 electrical degrees deference from the magnetizing axis M, since the permeabilities is of the rotor magnets 3a and 3b are much lower than that of the rotor core 2a. Reluctance torque is produced between the low reluctance axis X and the stator field.

First Exemplary Embodiment

Figure 1A:
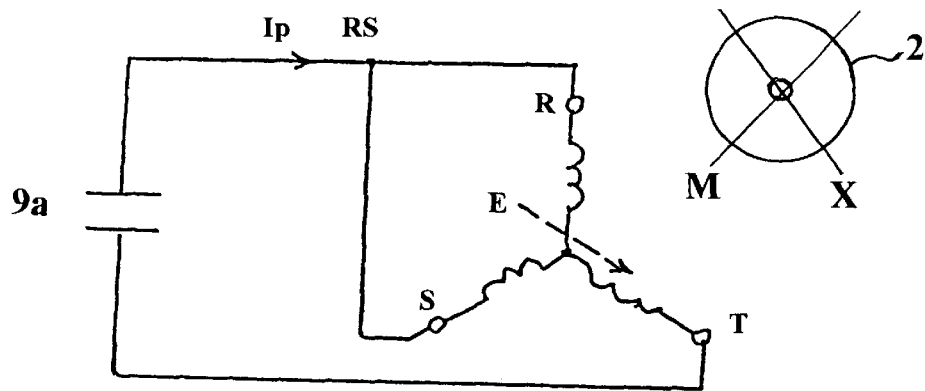
FIG. 1(a) and FIG. 1(b) depict magnetizing of the first exemplary embodiment of the present invention.
Figure 1B:
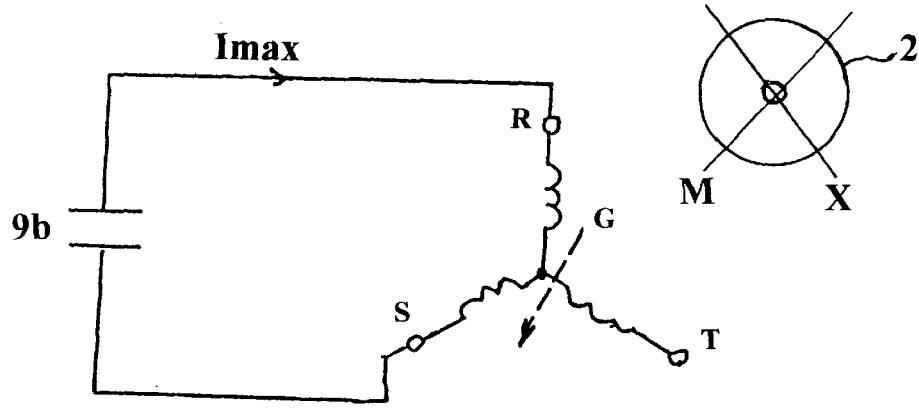
Figure 7:
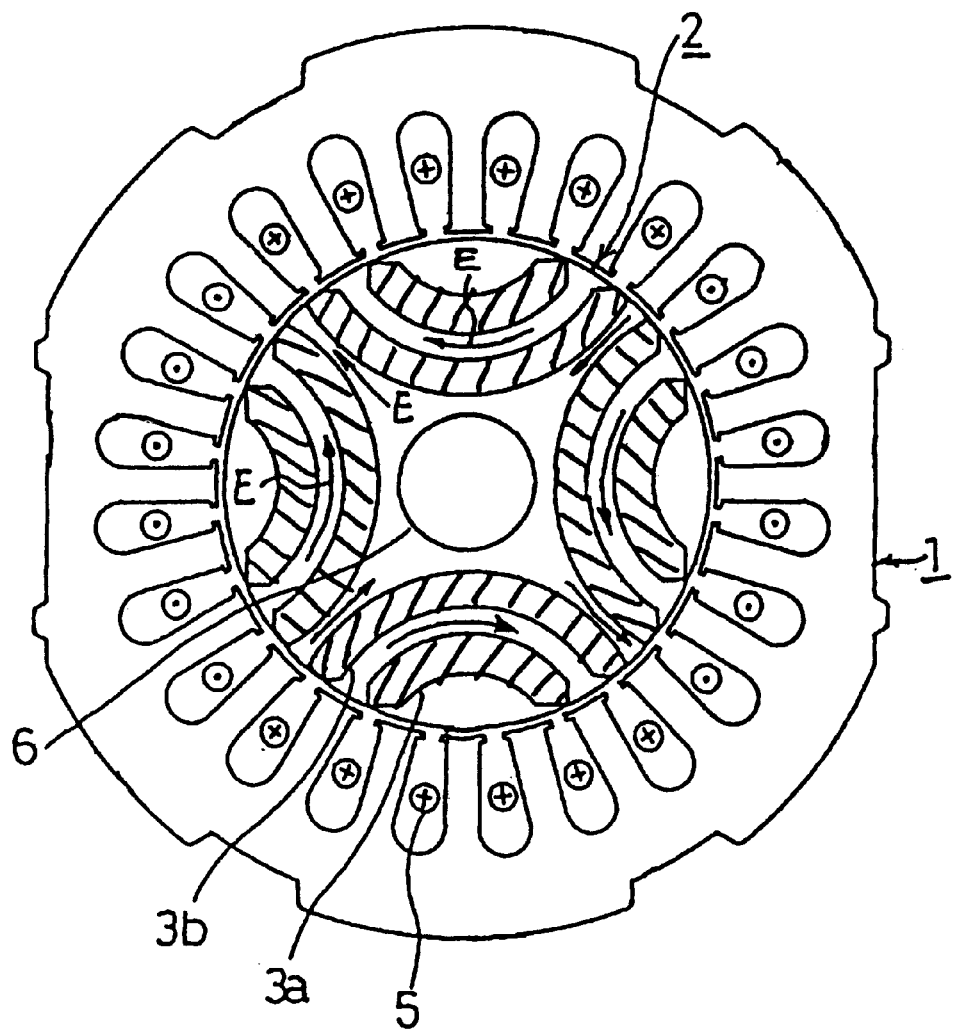
FIG. 7 depicts a distribution of positioning current in the stator slots, stator field E and the rotor 2 positioned at the magnetized position of the four-pole-reluctance-magnet-motor used in the first exemplary embodiment of the present invention.

The first exemplary embodiment of the present invention has the physical structure shown in FIG. 6 and electrical structure depicted in FIG. 1(a) and FIG. 1(b). As shown in FIG. 1(a), outer terminals R and S, of a Y connected three-phase stator coil, are coupled together to form an outer terminal RS. The positioning current Ip is fed from the positioning power supply 9a to both the outer terminals RS and T. As a result, the stator field E is produced. The rotor 2 is driven to rotate by the reluctance torque generated between the low reluctance axis X and the stator field E. As a result, the rotor 2 is positioned at the magnetizing position where the low reluctance axis X agrees with the stator field E. FIG. 7 depicts a distribution of the positioning current in the stator slot, the stator field E, and the rotor 2 positioned at the magnetizing position, where a shaft holding means (not shown) firmly holds the rotating shaft of rotor 2 in order to avoid moving when being magnetized.

Figure 5:
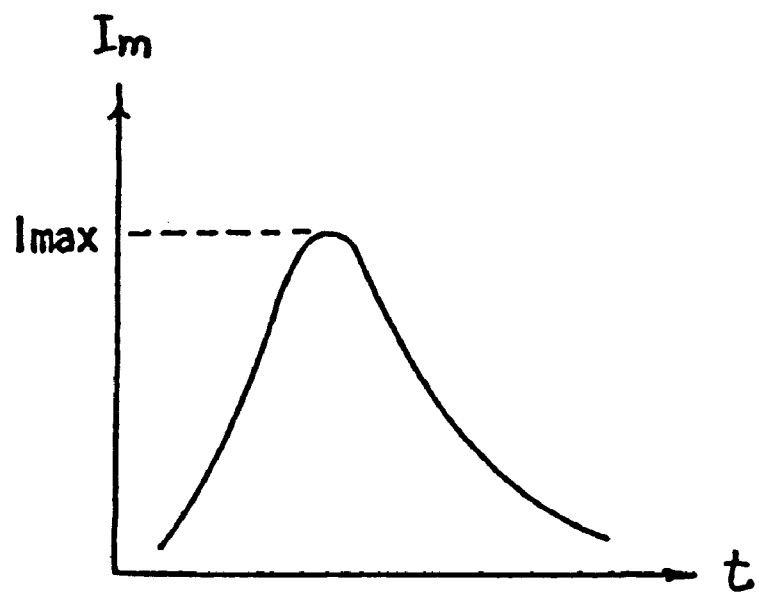
FIG. 5 shows a waveform of magnetizing current.
Figure 8:
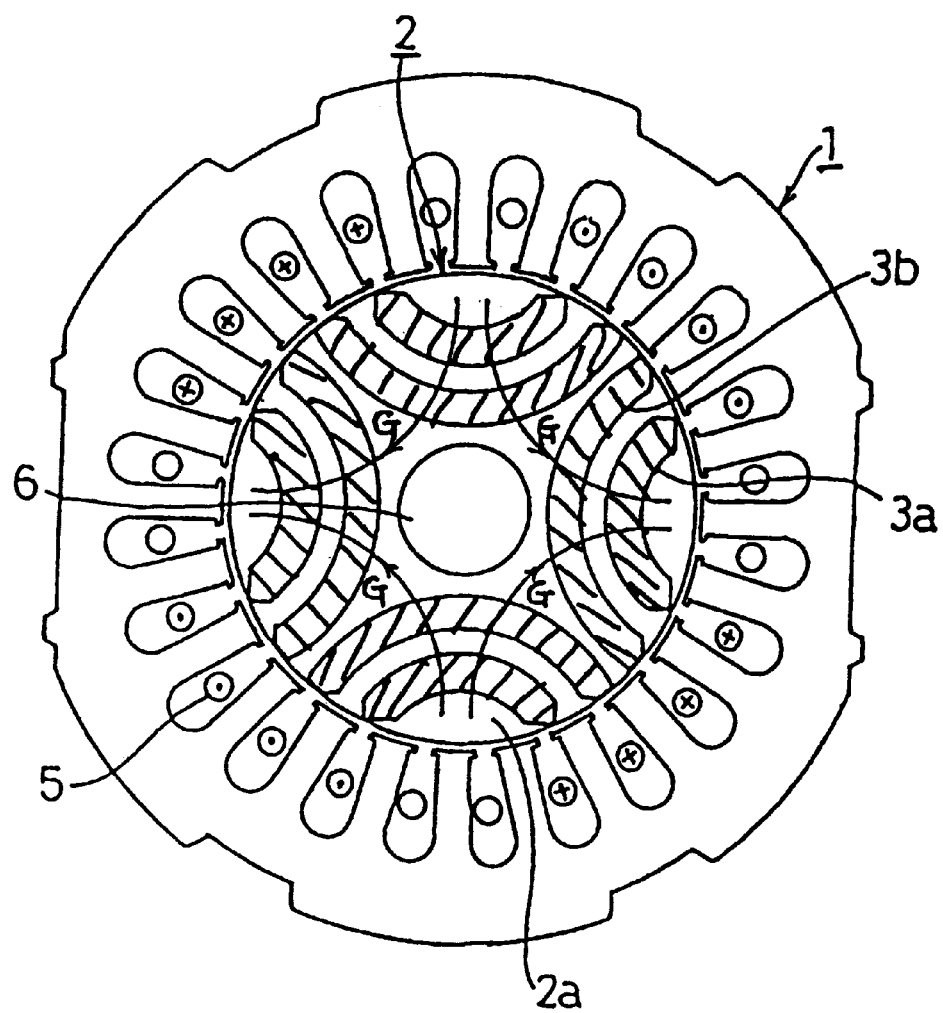
FIG. 8 depicts a distribution of magnetizing current in the stator slots and magnetizing field G of the four-pole-reluctance-magnet-motor used in the first exemplary embodiment.

Next, as shown in FIG. 1(b), the outer terminal RS is separated into the independent terminals R and S, and the magnetizing current Imax, having a waveform as shown in FIG. 5, is fed from the magnetizing power supply 9b to the outer terminals R and S, thereby producing the magnetizing field G. The rotor 2, held at the magnetizing position, is magnetized by the magnetizing field G along the magnetizing axis M, which is 90 electrical degrees deference from the low reluctance axis X. FIG. 8 depicts a distribution of magnetizing current in the stator slot and the magnetizing field G.

Second Exemplary Embodiment

Figure 2A:
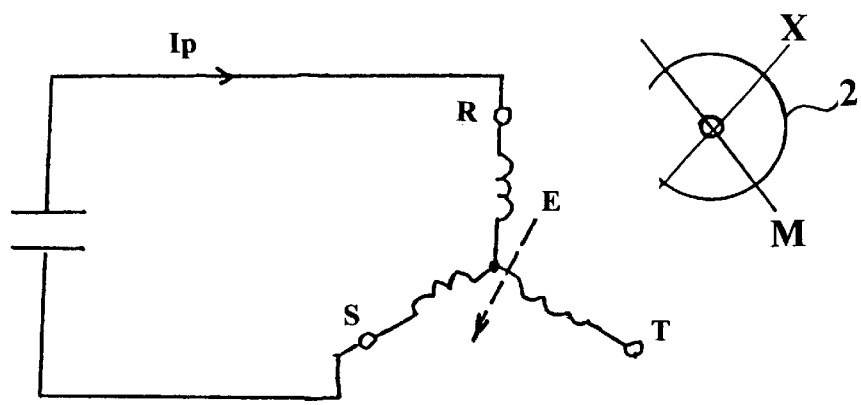
FIG. 2(a) and FIG. 2(b) depict magnetizing of the second exemplary embodiment of the present invention.

The motor used in the second exemplary embodiment of the present invention is the same one used in the previous exemplary embodiment. First, as shown in FIG. 2(a), the positioning current Ip is fed between the outer terminals R and S from the positioning power source 9a, thereby producing stator field E. The rotor 2 is driven to rotate by the reluctance torque produced between the low reluctance axis X and the stator field E. Then the rotor 2 is positioned at the magnetizing position where the low reluctance axis X agrees with the stator field E. At this magnetizing position, the rotating shaft of the rotor 2 is firmly held by the shaft holding means (not shown) in order to avoid moving.

Figure 2B:
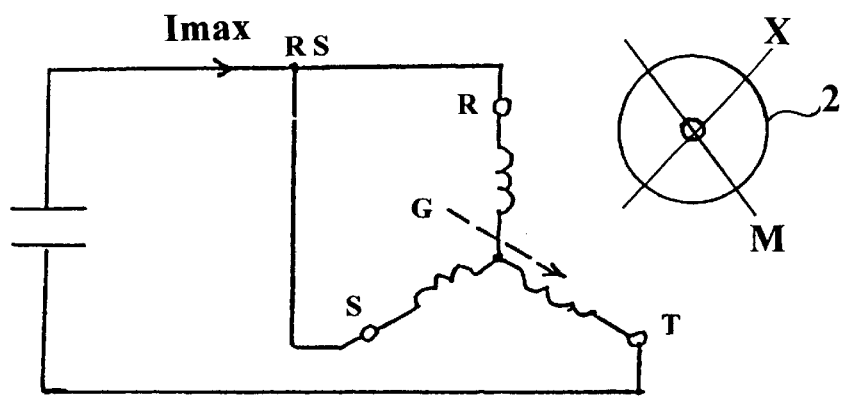

Next, as shown in FIG. 2(b), the outer terminals R and S are coupled to form the outer terminal RS, and the magnetizing current Imax is fed between the outer terminals RS and T from the magnetizing power supply 9b. As a result, the magnetizing field G is produced. The rotor 2, firmly held at the magnetized position, is magnetized by the magnetizing field G along the magnetizing axis M, which is 90 electrical degrees deference from the low reluctance axis X by the magnetizing field G.

Third Exemplary Embodiment

In the first and second embodiments, when the electrical angle difference between the low reluctance axis X and magnetizing axis M is deviated from 90 electrical degrees due to some cause, such as ununiform distribution of reluctance, reluctance torque is impulsively generated in magnetizing. This reluctance torque should be reduced, for it may damage the rotor.

In the third exemplary embodiment of the present invention, weak magnetizing is carried out with weak magnetizing current before the normal magnetizing in order to reduce said reluctance torque. In the normal magnetizing after the weak magnetizing, attracting force between the magnetizing current and the rotor magnet, which has been magnetized weakly, works against the rotation of rotor, and thereby reduces said reluctance torque.

The effect of the weak magnetizing, using a half of the normal magnetizing current, is described as follows:

$$Tr \propto I \sin 2\theta$$

where θ (electrical angle) is the deviation of the rotor and the magnetizing position,
where Tr represents the reluctance torque, and
where I represents the stator current.

The reluctance torque is proportional to the squared stator current. Therefore, when using a half of the normal magnetizing current for weak magnetizing, said reluctance torque is reduced to a quarter of the normal one. The rotor magnet is weakly magnetized by magnetic flux. Then, in the normal magnetizing performed after the weak magnetizing, the rotor magnet produces a magnet torque Tm against the reluctance torque.

$$Tm \propto \psi I \sin \theta$$

Accordingly, the torque applied to the rotor during normal magnetizing is reduced by Tm.

Repeated weak magnetizing, by increasing the magnetizing current step by step, is more effective for reducing said reluctance torque.

Fourth Exemplary Embodiment

Figure 9:
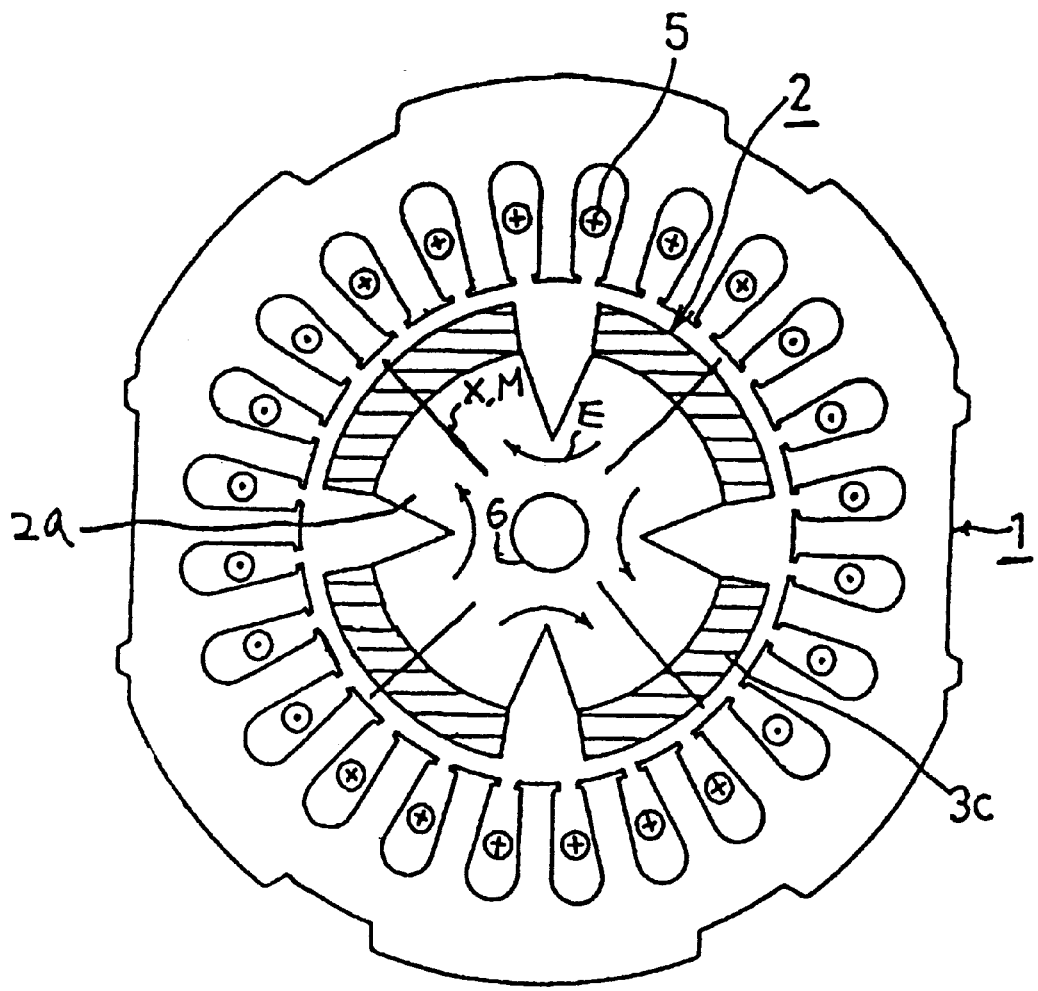
FIG. 9 depicts the low reluctance axis X and the magnetizing axis M of the four-pole-reluctance-magnet-motor used in the fourth and fifth exemplary embodiments of the present invention.
Figure 10A:
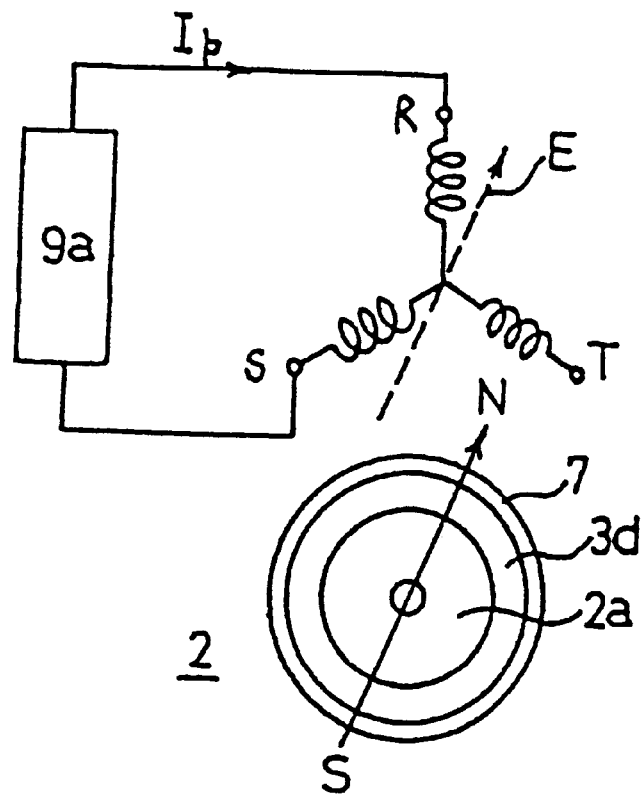
FIG. 10(a) and FIG. 10(b) depict the prior art.
Figure 10B:
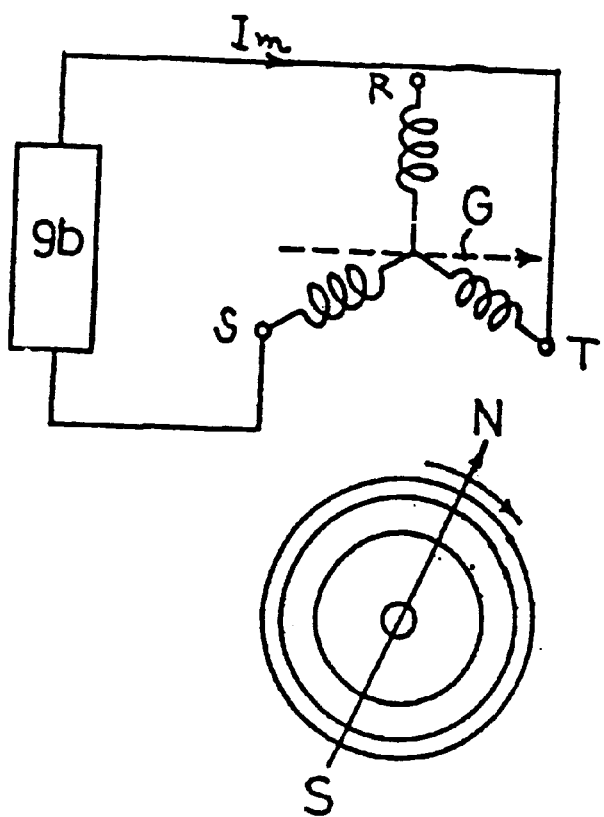

The fourth exemplary embodiment of the present invention has a physical structure shown in FIG. 9, where the unmagnetized rotor magnet 3c is adhered on the rotor core 2a. As FIG. 9 depicts, the low reluctance X axis of the rotor agrees with the magnetizing axis M.

Figure 3A:
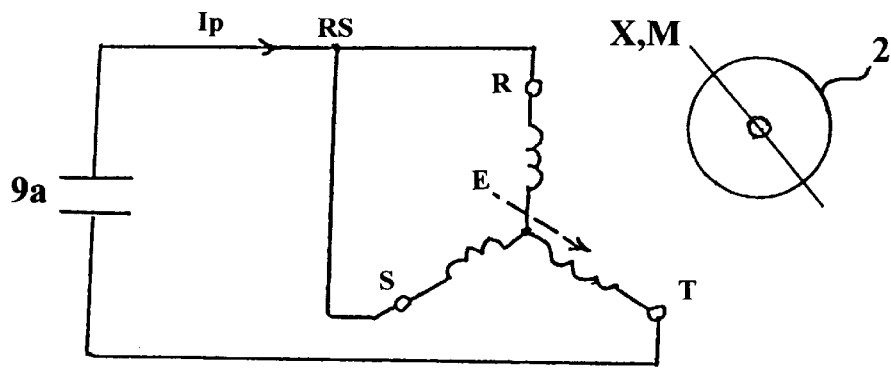
FIG. 3(a) and FIG. 3(b) depict magnetizing of the fourth exemplary embodiment of the present invention.

First, as shown in FIG. 3(a), the outer terminals R and S of stator coil are coupled together, thereby forming the outer terminal RS. The positioning current Ip is fed from the positioning power supply 9a to both the outer terminals RS and T. As a result, a stator field E is produced. The rotor 2 is driven to rotate by the reluctance torque generated between the low reluctance axis X and the stator field E, and the rotor 2 is positioned at the magnetizing position where the low reluctance axis X agrees with the stator field E. FIG. 9 depicts a distribution of the positioning current in the stator slot, the stator field E, and the rotor 2 positioned at the magnetizing position, where a shaft holding means (not shown) firmly holds the rotating shaft of rotor 2 in order to avoid moving when being magnetized.

Figure 3B:
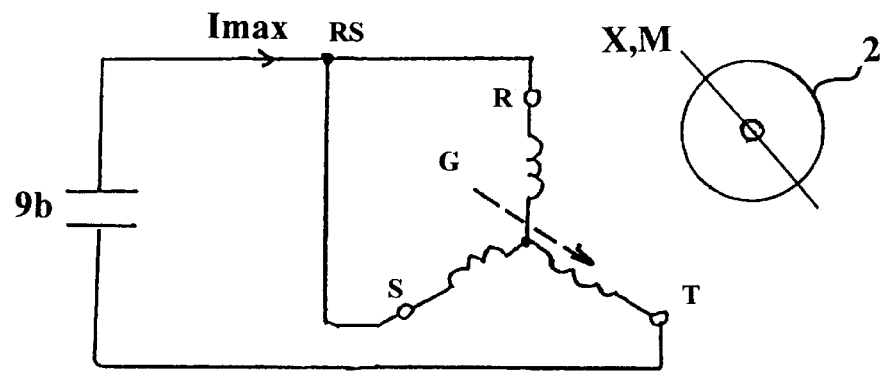

Next, as shown in FIG. 3(b), the magnetizing current Imax is fed from the magnetizing power supply 9b to the outer terminals RS and T, thereby producing the magnetizing field G. The rotor 2 held at the magnetizing position is magnetized by the magnetizing field G along the magnetizing axis M whose direction agrees with the low reluctance axis X.

Fifth Exemplary Embodiment

The motor used in the fifth exemplary embodiment of the present invention is the same one used in the fourth exemplary embodiment.

Figure 4A:
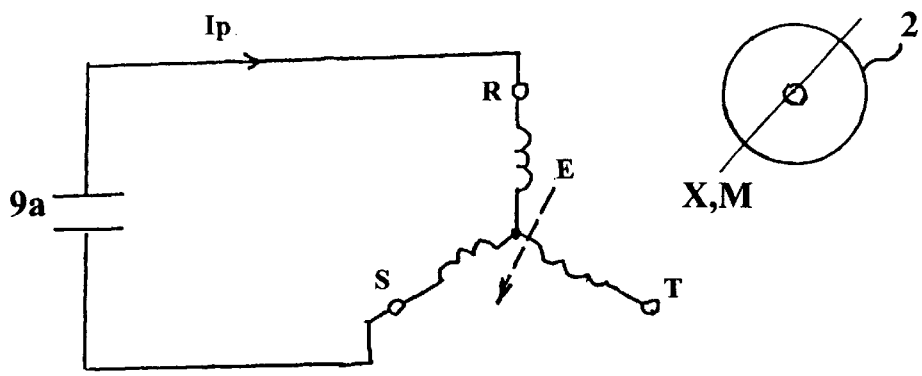
FIG. 4(a) and FIG. 4(b) depict magnetizing of the fifth exemplary embodiment of the present invention.

First, as shown in FIG. 4(a), the positioning current Ip is fed between the outer terminal R and S from the positioning power source 9a, thereby producing stator field E. The rotor 2 is driven to rotate by the reluctance torque generated between the low reluctance axis X and the stator field E. The rotor 2, then, is positioned at the magnetizing position where the low reluctance axis X agrees with the stator field E. At this magnetizing position, the rotating shaft of the rotor 2 is firmly held by the shaft holding means (not shown) in order to avoid moving.

Figure 4B:
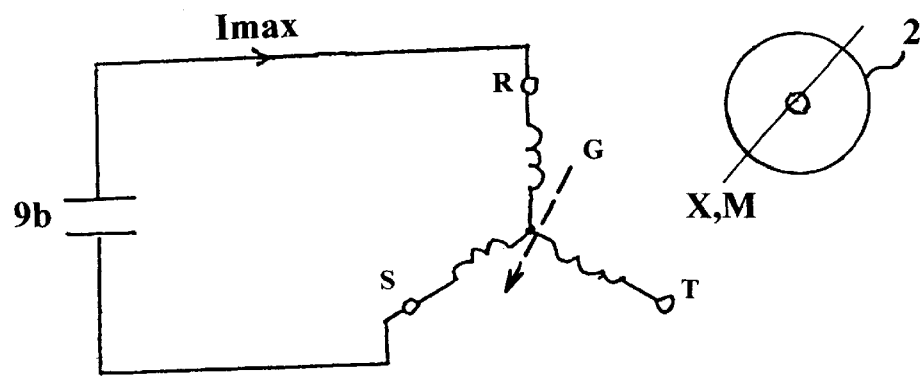

Next, as shown in FIG. 4(b), the magnetizing current Imax is fed between the outer terminals R and S from the magnetizing power supply 9b. As a result, the magnetizing field G is produced. The rotor 2, firmly held at the magnetized position, is magnetized by the magnetizing field G along the magnetizing axis M whose direction agrees with the low reluctance axis X.

Of course, it should be understood that a wide range of changes and modifications can be made to the preferred embodiment described above and that the foregoing description be regarded as illustrative rather than limiting. It is therefore intended that it is the following claims, including all equivalents, which are intended to define the scope of this invention.

What is claimed is:

1. A method for magnetizing a rotor magnet of a reluctance magnet motor having a stator and a rotor,
    said stator including a Y connected three-phase stator coil that has outer terminals R, S and T, and
    said rotor having a magnetizing axis of the rotor magnet and a low reluctance axis that is position 90 electrical degrees from the magnetizing axis,
    said method for magnetizing comprising the steps of:

(a) forming an outer terminal RS by coupling the outer terminals R and S, and feeding a positioning current through the outer terminal RS to the outer terminal T for positioning the rotor at a magnetizing position by reluctance torque,
(b) keeping the rotor at the magnetizing position by holding a rotating shaft of the rotor in order to avoid moving the rotor, and
(c) separating the coupled outer terminals RS, and feeding a magnetizing current through the outer terminal R to the outer terminal S for magnetizing the rotor magnet.

2. A method for magnetizing a rotor magnet of a reluctance magnet motor having a stator and a rotor, said stator including a Y connected three-phase stator coil that has outer terminals R, S and T, and said rotor having a magnetizing axis of the rotor magnet and a low reluctance axis that is position 90 electrical degrees from the magnetizing axis, said method for magnetizing comprising the steps of:
(a) feeding a positioning current through the outer terminal R to the outer terminal S for positioning the rotor at a magnetizing position by reluctance torque,
(b) keeping the rotor at the magnetizing position by holding a rotating shaft of the rotor in order to avoid moving the rotor, and
(c) forming an outer terminal RS by coupling the outer terminals R and S, and feeding a magnetizing current through the outer terminal RS to the outer terminal T for magnetizing the rotor magnet.

3. The method for magnetizing of claim 1, wherein step (c) of feeding a magnetizing current through the outer terminal R to the outer terminal S includes, first feeding a weak magnetizing current through the outer terminal R to the outer terminal S that is weaker than a normal magnetizing current for the weak magnetizing of the rotor magnet, and thereafter feeding a normal magnetizing current through the outer terminal R to the outer terminal S for the normal magnetizing of the rotor magnet.

4. The method of magnetizing of claim 3, wherein the step of first feeding a weak magnetizing current through the outer terminal R to the outer terminal S is repeated by increasing the weak magnetizing current step by step before the step of feeding a normal magnetizing current.

5. The method for magnetizing of claim 2, wherein step (c) of feeding a magnetizing current through the outer terminal RS to the outer terminal T includes, first feeding a weak magnetizing current through the outer terminal RS to the outer terminal T that is weaker than a normal magnetizing current for the weak magnetizing of the rotor magnet, and thereafter feeding a normal magnetizing current through the outer terminal RS to the outer terminal T for the normal magnetizing of the rotor magnet.

6. The method of magnetizing of claim 5, wherein the step of first feeding a weak magnetizing current through the outer terminal RS to the outer terminal T is repeated by increasing the weak magnetizing current step by step before the step of feeding a normal magnetizing current.

7. A method for magnetizing a rotor magnet of a reluctance magnet motor having a stator and a rotor, said stator including a Y connected three-phase stator coil that has outer terminals R, S and T, and said rotor having a magnetizing axis of the rotor magnet and a low reluctance axis that agrees with the magnetizing axis, said method for magnetizing comprising the steps of:
(a) forming an outer terminal RS by coupling the outer terminals R and S, and feeding a positioning current through the outer terminal RS to the outer terminal T for positioning the rotor at a magnetizing position by reluctance torque,
(b) keeping the rotor at the magnetizing position by holding a rotating shaft of the rotor in order to avoid moving the rotor, and
(c) feeding a magnetizing current through the outer terminal RS to the outer terminal T for magnetizing the rotor magnet.

8. A method for magnetizing a rotor magnet of a reluctance magnet motor having a stator and a rotor, said stator including a Y connected three-phase stator coil that has outer terminals R, S and T, and said rotor having a magnetizing axis of the rotor magnet and a low reluctance axis that agrees with the magnetizing axis, said method for magnetizing comprising the steps of:
(a) feeding a positioning current through the outer terminal R to the outer terminal S for positioning the rotor at a magnetizing position by reluctance torque,
(b) keeping the rotor at the magnetizing position by holding a rotating shaft of the rotor in order to avoid moving the rotor, and
(c) feeding a magnetizing current through the outer terminal R to the outer terminal S for magnetizing the rotor magnet.

* * * * *